United States Patent [19]

Hirsohn et al.

[11] Patent Number: 5,444,773
[45] Date of Patent: Aug. 22, 1995

[54] METHOD FOR RELEASING UNNECESSARY TRUCKS FROM A TELEPHONE CALL

[75] Inventors: Paul Hirsohn, Berkeley; David Dayner, Novato; Virginia Lacker, Petaluma, all of Calif.

[73] Assignee: Harris Corporation, Melbourne, Fla.

[21] Appl. No.: 83,525

[22] Filed: Jun. 30, 1993

[51] Int. Cl.$^6$ .................... H04M 3/42; H04M 7/00
[52] U.S. Cl. .................... 379/219; 379/225; 379/229; 379/207; 379/212
[58] Field of Search ............... 379/201, 211, 212, 220, 379/221, 228, 207, 210, 213, 214, 219, 225; 370/16

[56] References Cited

U.S. PATENT DOCUMENTS

| | | | |
|---|---|---|---|
| 4,293,735 | 10/1981 | Duret | 379/229 |
| 4,345,116 | 8/1982 | Ash et al. | 379/221 |
| 4,398,063 | 8/1983 | Hass et al. | 379/60 |
| 4,756,019 | 7/1988 | Szybicki | 379/112 |
| 4,788,721 | 11/1988 | Krishnan et al. | 379/221 |
| 4,873,517 | 10/1989 | Baratz et al. | 379/220 X |
| 4,896,350 | 1/1990 | Bicknell et al. | 379/220 |
| 4,991,204 | 2/1991 | Yamamoto et al. | 379/221 |
| 5,014,262 | 5/1991 | Harshavardhana | 379/221 X |
| 5,018,187 | 5/1991 | Marinho et al. | 379/221 |
| 5,018,194 | 5/1991 | Suzuki et al. | 379/230 |
| 5,058,105 | 10/1991 | Mansour et al. | 370/16 |
| 5,101,451 | 3/1992 | Ash et al. | 379/221 |
| 5,142,570 | 8/1993 | Chaudhary et al. | 379/221 |
| 5,212,691 | 5/1993 | Hokari | 379/221 |
| 5,319,640 | 6/1994 | Yamasaki et al. | 379/229 |

OTHER PUBLICATIONS

"AT&T Integrated Services Digital Network (ISDN) Primary Rate Interface and Special Application Specification User-Network Interface Description"; Jul. 1989.
"AT&T Integrated Services Digital Network (ISDN) Primary Rate Interface Specification", Jul. 1989.
"ISDN: Concepts, Facilities, and Services", Gary C. Kessler Copyright 1990 McGraw Hill Inc, pp. 125-144, Appendix C.
Northern Telecom Primary Rate Interface Doc. No. NIS A211-1 of Jan., 1992 (Section E. p. E-32).
British Telecom Doc. No. 188 of Sep. 1984 entitled "Digital Private Network Signalling System" No. 1 (DPNSS 1) (BTNR 188), (Sec. 11, pp. 4-6,22-24)(Sec. 19, pp. 1-12).

Primary Examiner—James L. Dwyer
Assistant Examiner—Scott L. Weaver
Attorney, Agent, or Firm—Sughrue, Mion, Zinn, Macpeak & Seas; Richard C. Turner; Raymond H. J. Powell, Jr.

[57] ABSTRACT

A method for recognizing and releasing unnecessary trunk lines in a private branch exchange telephone system including a plurality of switching nodes, each having a unique node identification number where each pair of nodes is connected by a plurality of trunk lines, includes steps for (a) compiling a telephone call identifier list containing node identification numbers and an associated trunk call identification number used in defining and connecting a call path between a calling party and a called party, (b) examining a call identifier list at each of the switching nodes for information indicative of redundant node identification numbers, and (c) releasing the unnecessary trunk lines between the redundant node identification numbers.

19 Claims, 6 Drawing Sheets

METHOD FOR RELEASING UNNECESSARY TRUCKS FROM A TELEPHONE CALL

FIELD OF THE INVENTION

The present invention relates generally to methods for releasing unneeded or unnecessary trunk lines from a telephone call. More specifically, the present invention relates to a method for releasing unnecessary trunk lines between private branch exchange system switching nodes when a call path is routed through the same switching node twice.

BACKGROUND OF THE INVENTION

A private network is set up for the exclusive use of a single user, e.g., a company or association. One common form of private network is the private branch exchange (PBX) or the private automated branch exchange (PABX), hereinafter PABX, which is a switching office used by organizations with a large need for internal communications. A PABX is commonly connected to at least one switching office of a public telephone network. One PABX may also be connected by tie trunks, i.e., trunk lines, to other PABXs belonging to the same user to create a PABX network, where each PABX constitutes a switching node of the switching network.

As a result of call routing, call forwarding, call transfer, or conducting a conference call across the PABX network using multiple switching nodes, a call may become connected over more trunks lines than are necessary to complete that call. It will be immediately appreciated that releasing all unnecessary trunk lines will reduce the cost of providing the voice path for the individual call. It will also be noted that reducing the total number of trunk lines required by the PABX network to provide adequate service to all customers will result in lower costs to the network owner.

Typically, PABX networks can be classified as employing centralized control or distributed control. It will be appreciated that PABX networks using centralized network control, e.g., a centralized private network controller such as Signaling System 7, avoid unnecessary trunk line usage through automatic B Channel Conservation features.

Centralized network control systems provide a wide variety of routing and switching of network call traffic with a view towards maximizing network utilization while minimizing call blocking. For example, U.S. Pat. No. 5,142,570 discloses a method for generating a set of routing paths from information including occupancy values. The routing method combines both modified state dependant routing and sequential routing techniques. It should be noted that this patent discusses the relevance of the U.S. Pat. No. 4,788,721. Both of these patents provide details regarding methods for predetermining call routing based on actual network usage data.

On the other hand, U.S. Pat. No. 5,101,451 describes methods for optimizing call routing based in part on the degree of trunk line loading. The '451 patent teaches that availability information for connecting a destination switching system with intermediate switching systems is generated and returned to the source switching system via a common channel whenever a direct circuit is not available between the two systems. In addition, the '451 patent provides a summary of the teachings of the earlier U.S. Pat. No. 4,345,116, which describes yet another method for permitting call path selection on a call-by-call basis.

U.S. Pat. No. 5,058,105 discloses an arrangement for establishing alternate paths in the event of a failure of a communications link where alternate paths are composed of expanding loops around the failed path. Thus, the '105 patent addresses the use of extra capacity, not the maximization of excess capacity. In contrast, U.S. Pat. No. 4,991,204 discloses a communication network which determines primary and alternate calling paths in advance and provides path data to the switching node. The switching node tries the primary calling path and then the alternate calling paths when attempting to complete a call. Finally, U.S. Pat. No. 4,756,019 discloses a system for maximizing revenues on a telephone network by monitoring call usage information using a central computer supplying preferred and alternate routing to the various switching nodes. In such a system, the lowest cost path is always chosen for the call.

It will be appreciated that much effort has been devoted to developing methods and procedures which can be used to route telephone calls between a calling party and the called party. However, little effort has been expended on methods for releasing unnecessary trunk lines, i.e., B Channels, for systems with distributed control systems. Certain applications, e.g., Voice Mail, include automatic release of unnecessary trunk lines. In a large switch application of a private network, trunks may output calls from a front end node that may be routed back, i.e., returned, to the same front end node for such centralized services as an Attendant or a Voice Mail System (VMS). The presence of centralized services depends on automatic B Channel Conservation to avoid congesting inter-machine Primary Rate Interfaces (PRIs).

Figure 1:
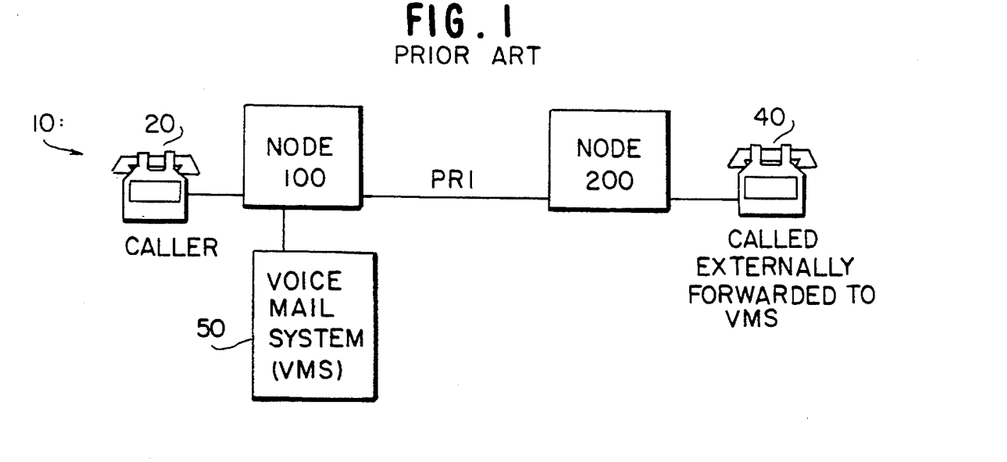
FIG. 1 is a high level block diagram of a conventional PABX network including provisions for connection to a voice mail system.

FIG. 1 shows an example of forwarding to VMS over PRIs in a private network. In FIG. 1, a calling party reaching the network at node 100 is routed to a station on node 200. When the call is not answered, the call is externally forwarded back to VMS system, which is connected to a trunk line off of node 100. Without releasing unnecessary B Channels, i.e., without B Channel Conservation, two B Channels would be allocated during the entire call because of the original call routing. It will be noted that two B Channels are unnecessary because the calling party can be directly connected to VMS within switching node 100. Other than the possibility of a No Answer extension for the PRI Trunk Group incoming to node 200 prior to conversation being initiated, there is no feature being provided by node 200 which is involved in the call. Instead, VMS quickly answers the call which causes B Channel Conservation to automatically release the two unnecessary B Channels. By waiting until conversation is initiated, B Channel Conservation also allows for the possibility of re-routing to a No Answer extension for the PRI Trunk Group incoming to node 200.

The identification and release of unnecessary trunk lines, particularly when more than two switching nodes are connected to complete a call, has not received the same attention as other routing problems.

SUMMARY OF THE INVENTION

The principal object of the present invention is to provide a method for use in a distributed control PABX network for identifying and releasing unnecessary trunk lines.

Another object of the present invention is to provide a method for use in a distributed control PABX network for identifying and releasing unnecessary trunk lines, whereby a minimum amount of memory is utilized in identifying redundant trunk lines because the identification information is contained in messages rather than being stored and maintained with the PABXs.

It is a further object of the present invention to provide a method for detecting and releasing redundant trunk lines wherein information needed to identify unnecessary trunk lines is provided so as not to interfere with conversations. According to one aspect of the invention, information is routed through ISDN D Channels so as not to interfere with conversations carried on ISDN B Channels.

These and other objects, features and advantages of the present invention are provided, in a private branch exchange telephone system including a plurality of switching nodes, each having a unique node identification number where each pair of nodes is connected by a plurality of trunk lines, by a method for recognizing and releasing unnecessary trunk lines. The method includes steps for (a) compiling a telephone call identifier list containing node identification numbers and an associated trunk call identification number used in defining and connecting a call path between a calling party and a called party, (b) examining a call identifier list at each of the switching nodes for information indicative of redundant node identification numbers, and (c) releasing the unnecessary trunk lines between the redundant node identification numbers.

These and other objects, features and advantages of the present invention are provided, in a private branch exchange telephone system including a plurality of switching nodes, each of the nodes having a unique node identification number and each pair of the switching nodes being connected by a plurality of trunk lines carrying voice data and at least one alternative signaling path, a method for recognizing and releasing unnecessary trunk lines. The method includes the steps of (a) transmitting a first node identification number and a first trunk call identification number corresponding to a first portion of the call path between a first node and a second node in a predetermined direction along the signaling path, (b) repetitively appending a next node identification number and a next trunk call identification number for each subsequent portion of the call path to thereby generate a telephone call identifier list containing each of the node identification numbers and an associated trunk call identification number used in a call path between a calling party and a called party, (c) examining the call identifier list for information indicative of redundant node identification numbers and (d) releasing the unnecessary trunk lines between the redundant node identification numbers.

These and other objects, features and advantages of the present invention are provided, in a method for recognizing and releasing unnecessary trunk lines in a private branch exchange telephone system including a plurality of switching nodes, wherein each of the nodes being assigned a unique node identification number and wherein any of the switching nodes are connected by a plurality of trunk lines carrying voice data and at least one alternative signaling path. The method advantageously includes the steps of:

(a) generating a list request message each time a predetermined operating state is achieved in one of the nodes;

(b) transmitting the request message along the signaling path in a first predetermined direction along the call path;

(c) when the message request arrives at one end of the call path, transmitting a first node identification number and a first trunk call identification number corresponding to a first portion of the call path between a first node and a second node in a second predetermined direction along the signaling path to thereby generate a call identifier list;

(d) comparing each of the node identification numbers in the call identifier list with a current node identification number corresponding to the node receiving the call identifier list;

(e) when one of the node identification numbers in the call identifier list is the current node identifier number, establishing a new call path between the calling party and the called party, the new call path bypassing the unnecessary trunk lines between redundant node identification numbers and, when the new call path is complete, releasing the unnecessary trunk lines between the redundant node identification numbers; and (f) when no match is established between any of the node identification numbers and the current node identification number, repetitively appending a next node identification number and a next trunk call identification number for each subsequent portion of the call path.

These and other objects, features and advantages of the invention are disclosed in or are apparent from the following description of preferred embodiments.

BRIEF DESCRIPTION OF THE DRAWINGS

The preferred embodiments are described with reference to the drawings, wherein like elements are denoted by like or similar numerals, and wherein.

DESCRIPTION OF THE PREFERRED EMBODIMENTS

Forwarding outside calls back to an Attendant or VMS is a common private network feature for large switches that has the potential to congest PRI trunks. In the example discussed with respect to FIG. 1, B Channel Conservation could have acted like an automatic Release Link Trunk by detecting that a call proceeds back and forth over the same PRI. It will be appreciated that the release of unnecessary B Channels is different from a true Release Link Trunk operation. B Channel Conservation uses two inter-machine trunks before a transfer and then releases the inter-machine trunks after the conversation has been transferred. A True Release Link Trunk operation only uses one inter-machine trunk before a transfer because the held party would be remotely held over a single inter-machine trunk. In any event, instead of just detecting calls that return over the same PRI trunk, B Channel Conservation more generally detects conversations that have returned to the same switching node.

It will be noted that each PRI trunk typically consists of a plurality of B Channels, e.g., twenty or more ISDN B Channels, and at least one ISDN D Channel. In contrast, a Basic Rate Interface (BRI) trunk contains two conversation channels and does not support data transfer between switching nodes because it is connected to only one switching node. Thus, BRIs are unsuited for implementing B Channel Conservation methods. It will be appreciated that PRIs conform to CCITT standards, as exemplified in AT&T ISDN Primary Rate Interface Specification TR 41449 and AT&T ISDN PRI and Special Applications Specification TR 41459. Both of these documents are incorporated by reference herein for all purposes.

Figure 2:
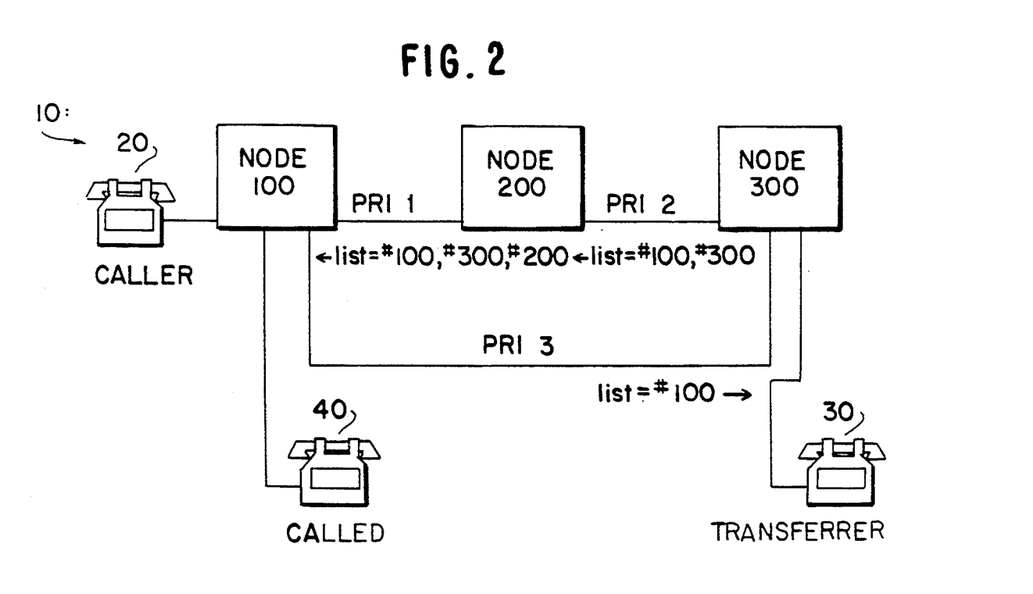
FIG. 2 is a high level block diagram of a PABX network which is useful for illustrating a preferred embodiment of the method according to the present invention.

FIG. 2 shows an example of call transfer over PRIs connecting switching nodes in a private PABX network 10. A incoming call from calling party 20 is received on node 100. The received call is routed over PRI 1 to node 200, and is subsequently forwarded over PRI 2 to node 300. As shown in FIG. 2, the call is then transferred by transferring party 30 over PRI 3 directly back to node 100. The call is finally completed when called party 40 answers.

It will be noted that without B Channel Conservation, three B Channels would be allocated during the entire call because of the transfer. It will also be noted that a similar situation could result from abandoning a prior conference call. The three B Channels are unnecessary because the calling party can be directly connected to the called party via node 100. Other than the possibilities of being on hold or of being a Serial Call after conversation is initiated, there is no feature involved in the call being provided by nodes 200 or 300. As will be explained in detail below, if the call were on hold in node 100, then B Channel Conservation would be applied again when the call is reconnected. It will also be appreciated that if Serial Call is marked by node 300, then B Channel Conservation would not be able to alter the call because the call is returned to the transferer when it is abandoned.

Instead of allowing the three unnecessary B Channels to remain, B Channel Conservation detects that a conversation has returned to node 100 by sending B Channel Conservation messages over each of the PRIs when conversation is initiated. By waiting until conversation is initiated, B Channel Conservation also allows for the possibility of re-routing to a No Answer extension for the PRI Trunk Group incoming to node 100 before the call is answered. It will be appreciated that this also permits the possibility of a Station Transfer Security alerting timeout returning the call to the transferer on node 300 before the call is answered.

In order to detect unnecessary B Channels, B Channel Conservation messages contain a list of the switch IDs related to a call. A repetition of the same switch ID indicates that the call has returned to the same PABX switching node through one or more unnecessary B Channels. It will be appreciated that, in order to allow this comparison, the private PABX network must be configured with no duplication of switch IDs. In order to assure a complete and accurate list, each switching node that handles the call must send a B Channel Conservation request message in a predetermined direction, e.g., toward the called PRI.

In the exemplary case illustrated in FIG. 2, the request message is forwarded from node 300 toward PRI 3 to node 100. Then a B Channel Conservation reply message is passed all the way back in the opposite direction through all PRIs.

A B Channel Conservation reply message accumulates a list of the switch IDs that are connected by PRIs. In FIG. 2, the resulting list at node 100 consists of node 100, node 300, and node 200.

When a switching node receives a list containing its own Switch ID, the presence of unnecessary B Channels is indicated. In an exemplary case, this list may be limited to ten entries. In that case, unnecessary B Channels might not be detected in a private network call containing more than ten switching nodes. In another exemplary case, the list may be limited to approximately twice the number of switching nodes in the network. It will be appreciated that increasing the size of the list will slow system performance as more time is devoted to B Channel Conservation. It will also be noted that the repeated node may disconnect the unnecessary B Channels, except when one of the nodes has the call on hold or the call is marked for a Serial Call return to its Attendant.

In FIG. 2, node 100 first connects the calling party directly to the called party in order to avoid any break in the voice path. The resulting connection produces a change in system state which initiates another B Channel Conservation message sequence. Then node 100 disconnects PRI 1, which also results in the disconnection of PRI 2 and PRI 3. In short, nodes 200 and 300 are disconnected.

A more detailed description of the method for releasing unnecessary trunk lines according to the present invention is presented immediately below. This method of releasing unnecessary trunks from a telephone call performs distributed computations at each switching node in the absence of a centralized network control. This method sends signaling information along the call path in order to identify calls that return to the same switching node. The presence of unnecessary trunks is indicated when the signaling information returns its own node identifier information back to itself. When the voice path of a telephone call returns to the same switching node in a telephone network, the trunks connecting the returning portion of the call are unnecessary and may be released by the step described in detail below.

It will be noted that by configuration, each switching node in a telephone network is assigned a different, i.e., unique, node identification number. Also by configuration, each switching node is able to determine whether the telephone equipment at the other end of each of its trunks also employs this method. The configuration for such nodes further indicates how to send signaling information to each such node. Preferably, within each identified switching node, each consecutive trunk call is assigned a different trunk call identification number. Therefore, this method does not affect unrelated calls routed over the same trunk line.

During a telephone call a telephone call identifier list is constructed consisting of all of the node identifiers with their corresponding trunk call identifiers that form the complete telephone call path. The time that is chosen for the generation of the call identifier list advantageously may be arbitrarily selected to complement the particular network system implementation. Preferably, the call identifier list is generated each time a call is answered. The call identifier list may also advantageously be generated when a switching node transfers the call to another switching node.

At the predetermined time during the progress of the telephone call, generally corresponding to a change in operation state of the switching node handling the call, a particular implementation of this method within the switching nodes chooses to check for the presence of unnecessary trunks. Preferably, the PABX initiates this method at each answer or transfer of conversation. The frequency and appropriateness of these chosen times during the telephone call is chosen solely by the particular implementation, not by the method itself, because this method assumes that the list construction does not disturb the voice call.

At the chosen time during the telephone call, a signaling message is sent from the decision node to request creation of the telephone call identifier list. This method assumes that an information signaling path is used between nodes that does not disturb the voice call. The signaling path advantageously does not disturb the voice path because it is separate from the voice path, e.g., an ISDN D Channel, a host computer link, or an RS-232C link passing signaling information between nodes.

When a telephone call is transferred, the decision node may be in the middle of the call path. Although a telephone call identifier list representing only a portion of the call path might be useful, only the complete list represents the furthest extent of the call path. Therefore, at the chosen time, the decision node sends a request rather than a list to the next node along the call path. In an exemplary case, the next node is the node switching the voice signals at the far end of the trunk carrying the telephone call. The list request message is associated with the voice call in order to allow the request to follow the voice call path. Of course, the decision node may advantageously turn out to already be at the furthest extent of the call path.

When the list request message is received at a switching node at either end of the telephone call path beyond which the telephone equipment no longer employs this method, the telephone call identifier list is started. Initially, this list contains the current node's unique switch ID and the trunk call identifier associated with that particular call. The initial identifier list is sent back to the next node in the call path.

Preferably, each switching node employing this method examines the received identifier list and then appends its own unique switch ID and trunk call identifier to the list. The growing list is then sent to the next switching node along the call path. It will be noted that this method may also advantageously work, in some cases, when an intermediate node passes along the received list information without alteration.

The presence of unnecessary trunks is indicated when a switching node receives a list that already contains its own unique switch ID. When its own node switch ID is contained in the list, the associated trunk call identifier indicates where the other end of the telephone call path appears within the same node. The intervening trunks are therefore unnecessary to maintain a voice path for the telephone call because the remaining parties may be directly connected within the current switching node.

In order to avoid affecting the audio of the voice call, the switching node advantageously connects the new call path before disconnecting the unnecessary trunks. Preferably, the unnecessary trunks are then released by being abandoned normally.

Referring again to FIG. 2, the following example illustrates a preferred embodiment of the method of releasing unnecessary trunks from a telephone call that results from a transfer of conversation within a network of three PABXS. The calling party at PABX node 100 was routed over PRI 1 and PRI 2 to PABX node 300. The call was subsequently placed on hold by the Transferrer, and then was transferred over PRI 3 back to the called party who is attached to PABX node 100. It will be noted that, without releasing unnecessary trunks, three trunks would remain allocated during this entire call after the transfer. These three trunks are unnecessary because the calling party can be directly connected to the called party within PABX switching node 100.

In order to detect the unnecessary trunks, messages are sent between the PABXs in order to identify the PABXs that connect the resulting call. In order to assure a complete and accurate telephone call identifier list, PABX switching node 300, the PABX node that performed the transfer, sends a list request message along the call path via PRI 3 to PABX node 100. As will be appreciated from FIG. 2, PABX node 100 terminates the call path. Therefore, PABX node 100 replies with an initial telephone call identifier list that contains its own unique switch ID, thus indicating node 100. PABX node 300 appends its own switch ID and passes the resulting list, e.g., node 100; node 300, to PABX node 200. PABX node 200 in turn appends its switch ID and passes the resulting identifier list, e.g., node 100; node 300; node 200, to PABX node 100.

When PABX node 100 receives a message with a telephone call identifier list that contains its own switch ID, PABX node 100 determines that unnecessary trunks are present. Furthermore, PABX node 100 is able to locate the other end of the call from the additional trunk call identifier that is carried along with the associated switch ID in the telephone call identifier list. Therefore, PABX node 100 first advantageously directly connects the calling party to the called party, in order to avoid any audible break in the voice path, and then disconnects the unnecessary trunks. It will be appreciated that direct connection may also result in a new connection that could generate an additional list request message among the remaining trunks in the call in order to detect unnecessary trunks present in the resulting call.

Figure 3A:
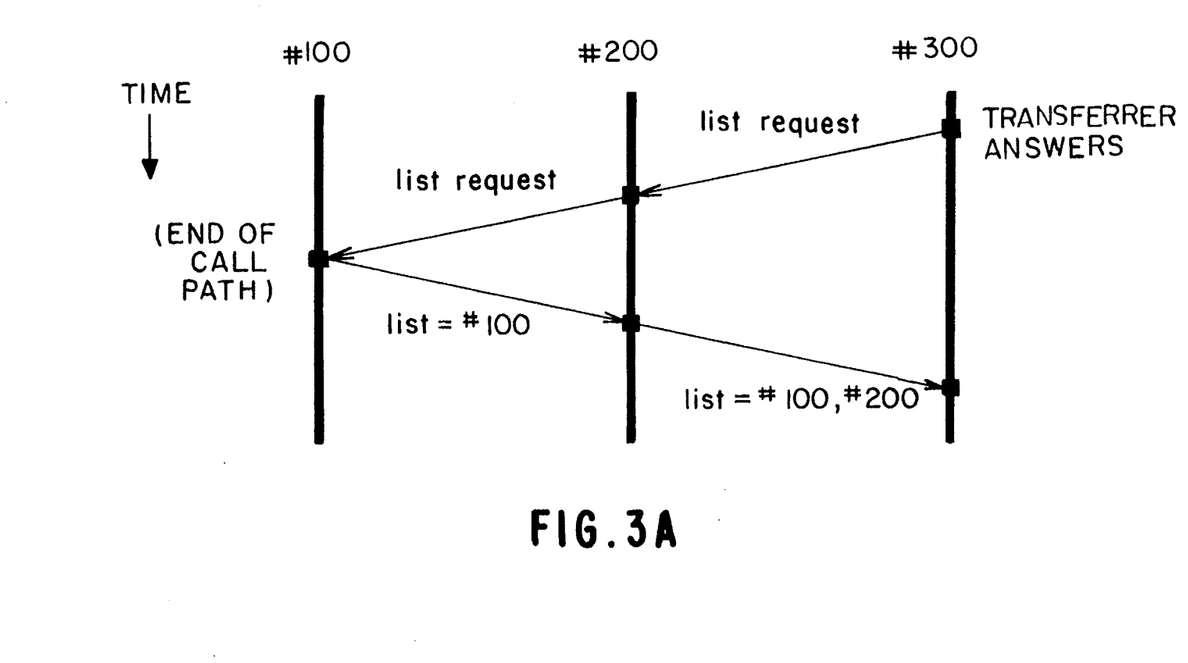
FIGS. 3A and 3B are high level schematic diagrams useful in explaining the call routing progression in a network employing the method according to the present invention.
Figure 3B:
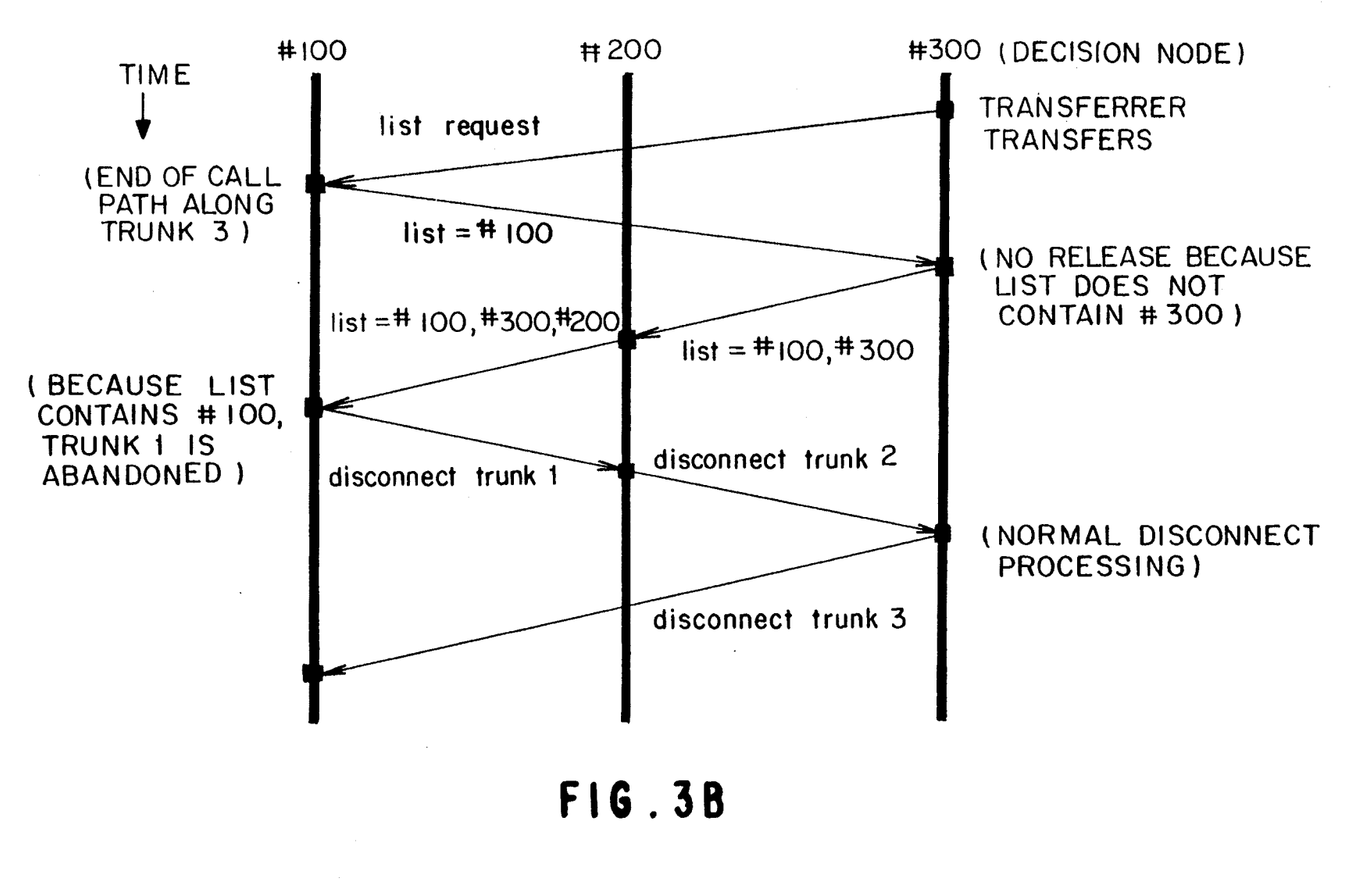

FIGS. 3A and 3B are high level schematic diagrams which are useful in explaining routing progression in a network employing the method according to the present invention.

FIG. 3A illustrates an exemplary case wherein a call originating with calling party 20 is routed to transferrer 30 in the PABX network 10 shown in FIG. 2. In this exemplary case, node 300 generates an identifier list request message when transferrer 30 answers the call. This list request message is sent via PRI 2 to node 200 and, subsequently, to node 100 via PRI 1. Since node 100 is the end of the call path, the identifier list message is generated by node 100 and forwarded to the node 300 via node 200 using PRI 2 and PRI 1, respectively. As indicated in FIG. 3A, when the identifier list message does not contain the unique switch ID corresponding to node 300, no action, e.g., no release of unnecessary trunk lines, occurs.

As shown in FIG. 3B, the full routing shown in FIG. 2 results in the use of unnecessary trunk lines and subsequent release of these trunk lines as a result of B Channel Conservation.

Referring to FIGS. 2 and 3B, it will be appreciated that when node 300 transfers the call, a subsequent identifier list request message is generated by node 300 and transferred through the ISDN D Channel to the end of the call path along PRI 3, i.e., to node 100. Since this is the termination of the path through the switching nodes in the network 10, an identifier list message is generated containing the unique switch ID corresponding to node 100. This message is then passed to node 300.

When the identification list message is received by node 300, no action is taken since by the identifier list message does not contain the unique switch ID corresponding to node 300. Node 300's only action is to pass the identifier list message along to node 200, after adding its own unique switch ID and corresponding trunk identification information. Node 200, in turn, passes the identifier list message to node 100 after confirming that the switch ID corresponding to node 200 is not contained in the list.

At node 100, the identification list message is examined. Node 100 determines that its own switch ID is contained in the list, indicating a redundant trunk line is being used. Thus, from the information contained in the message identifier list, node 100 connects the calling party directly to the called party. Normal disconnection of the unused trunk lines then proceeds.

Figure 4A:
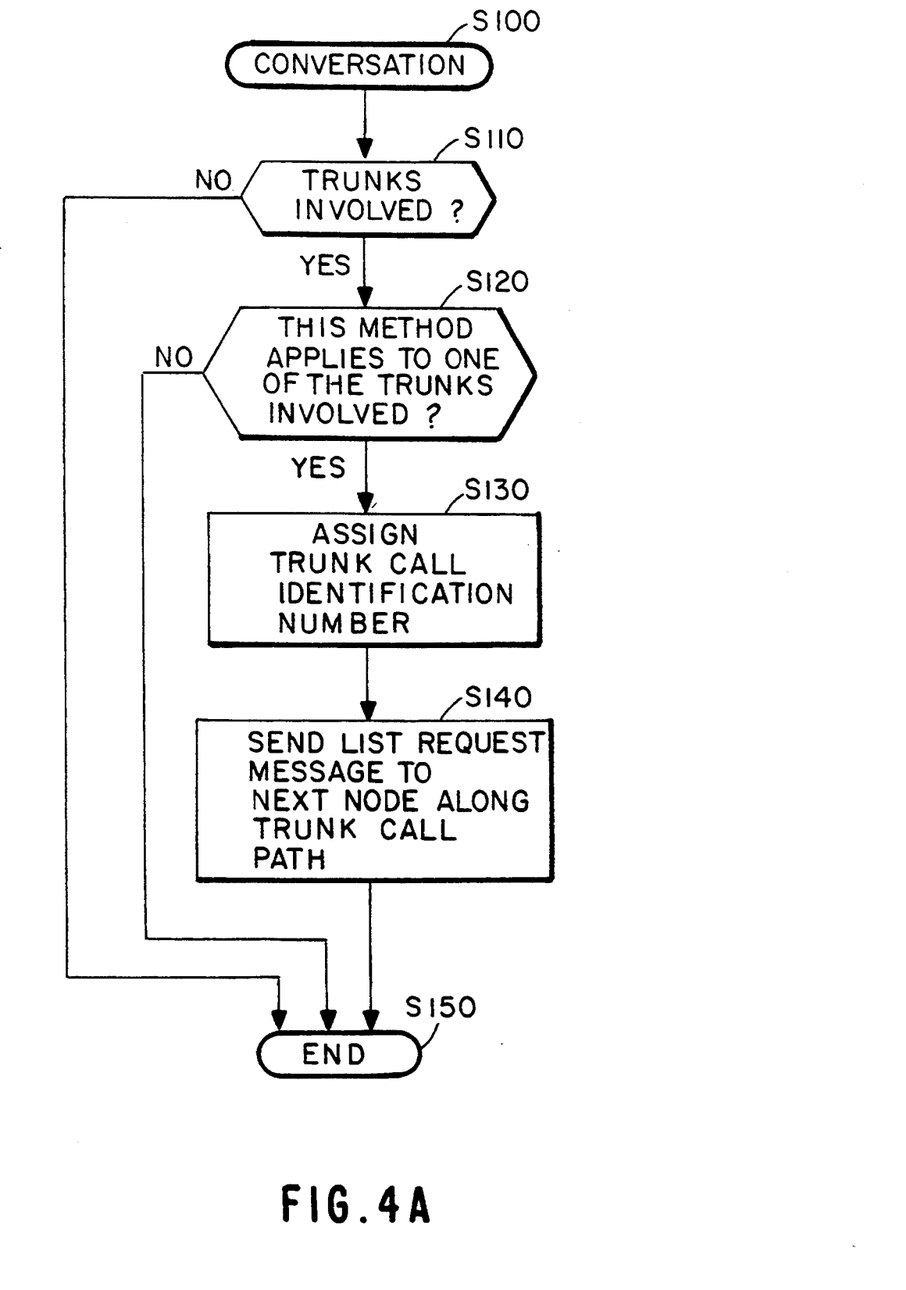
FIGS. 4A, 4B and 4C are flow charts useful in explaining a preferred embodiment of the method according to the present invention.
Figure 4B:
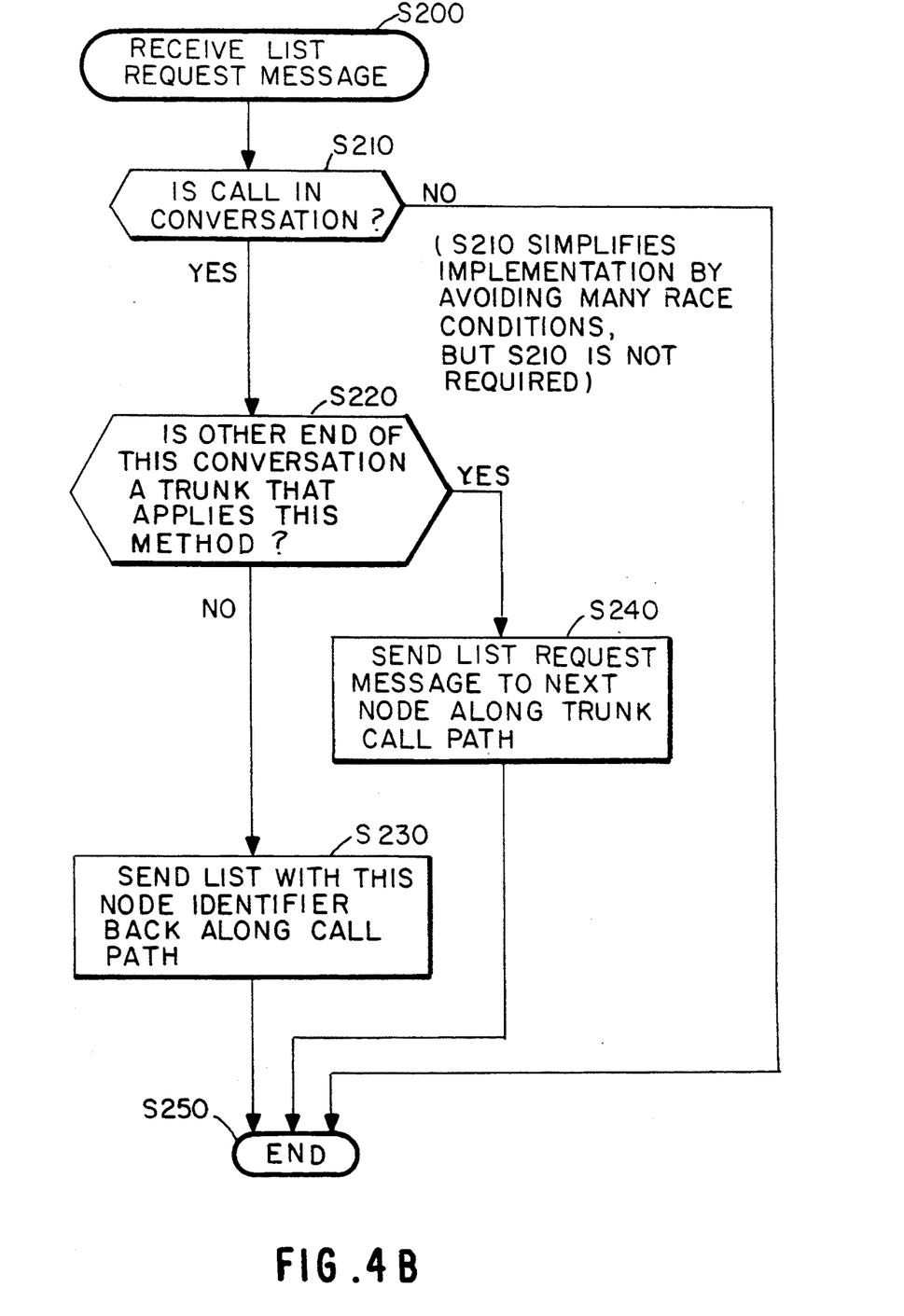
Figure 4C:
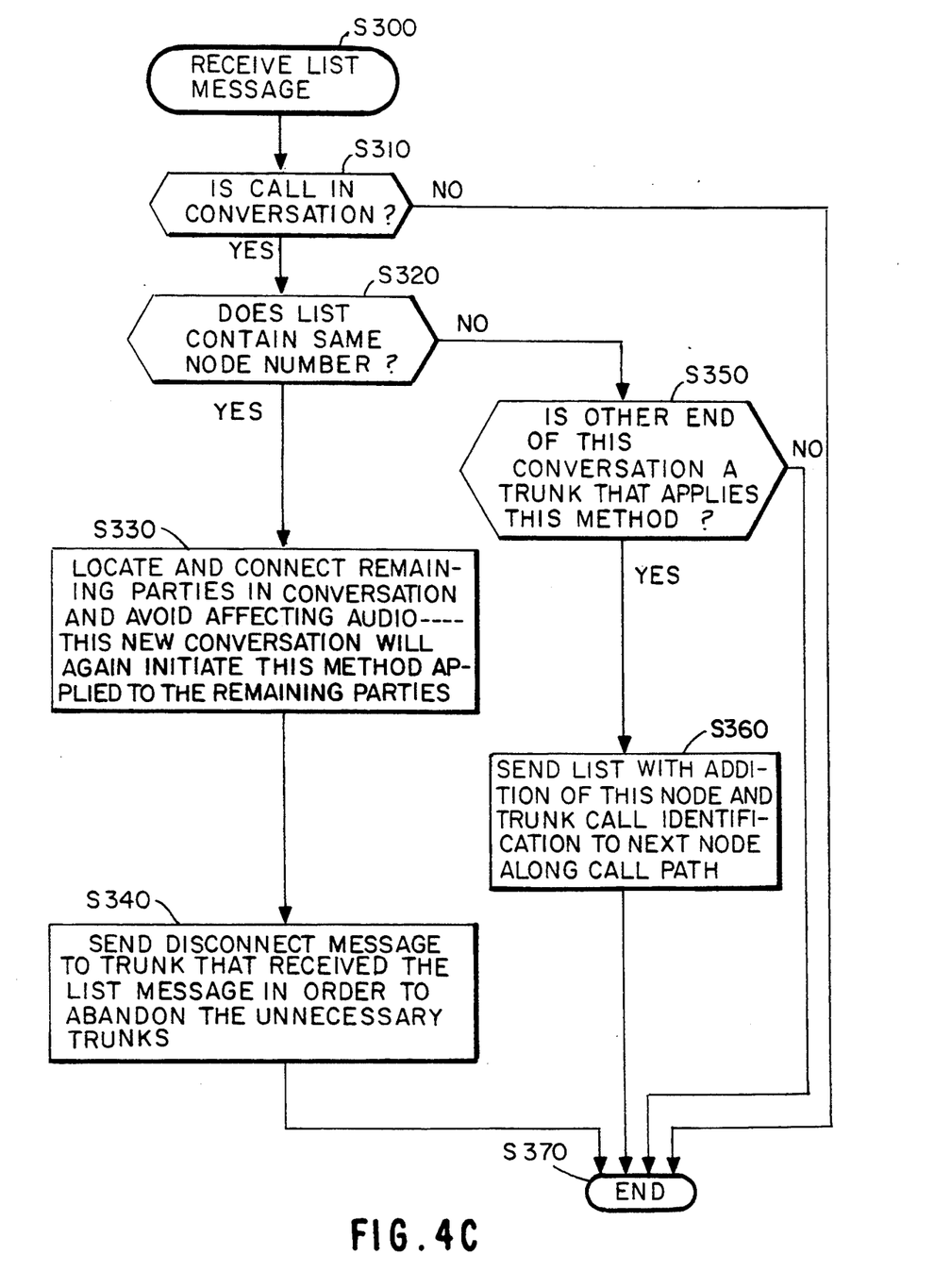

FIGS. 4A, 4B and 4C are flow charts for illustrating the method according to the present invention. It will be appreciated from review of FIGS. 4A, 4B and 4C that the method employs a limited number of steps. It will be appreciated that since the inventive method is a distributed control method, the action of any particular switching node is determined by the information produced from other switching nodes as well as the upstream and downstream connections to these nodes.

For example, as shown in FIG. 4A, the switching node 300 checks system status to determine whether a conversation has been initiated since the last check at step 100. A check is then performed in step 110 to determine whether trunk lines are involved. If trunk lines are not involved, flow control of the program passes to step 150. However, if the answer received in step 110 is YES, a second test is applied at step 120 to determine whether the method applies to one of the trunk lines involved. If the answer is NO, the program is again terminated at step 150. However, if the answer is YES, the node assigns the trunk call identification number to the call at step 130 and then sends the list request message to the next node along the trunk call path during step 140.

As shown in FIG. 4B, the node, for example, node 100, waits to receive a list request message during step 200. When a list request message is received, a check is made to determine whether the call is in conversation mode during step 210. If the answer is NO, flow control steps to step 250 and ends the routine. However, if the answer is YES in step 210, an additional check is made to determine whether the other end of the conversation is associated with a trunk which also implements the inventive method. If the answer is YES, a list request message is forwarded to the next node along the call path at step 240. However, if the answer is NO when the check is performed in step 220, the switching node 100 sends a identifier list containing its switch ID and trunk call identification number back along the call path. Thus, at step 240, the system stops generating list request messages and starts generating identifier list messages.

As shown in FIG. 4C, the switching node waits to receive a list message during step 300. At step 310, a test is performed to see whether the call is in conversation mode or not. It will be appreciated that this step greatly simplifies implementation by avoiding many signaling conditions. If the call is not in conversation, the flow control of the program steps to step 370 and the program ends. However, if the call is in conversation mode, one of two alternative paths is implemented.

In step 320, the identifier list message is checked to determine if the list contains the unique switch ID corresponding to the node number of the current node. If the answer is YES, the node locates and connects the parties during a step 330 and then sends a disconnect message or then abandons the unnecessary trunks in a step 340. The routine then ends at step 370. However, if the answer is NO in step 320, the program further checks at step 350 to determine whether the other end of the conversation employs a trunk applied to the current invented method. If the answer is NO, program steps to step 370 and ends. However, if the answer is YES, the program appends its own switch ID and trunk call identification number information to the list and sends it along the call path to the next node at step 360.

It will be appreciated that each of the nodes 100, 200 and 300 all perform the steps illustrated in FIGS. 4A, 4B and 4C, albeit not at the same time.

It will be appreciated that the above described method can be readily modified without departing from the spirit and scope of the invention. For example, the inventive method could be readily modified to generate list request and identifier list messages when the switching node is in a ringing mode instead of a conversation mode. Furthermore, other signaling paths, e.g., a RS-232C data line, could replace the ISDN D Channel without departing from the invention. It will also be noted that conservation of other types of channels, e.g., E+M trunks, can also be implemented using the present invention. Finally, it will be apparent that path identification information could be stored and maintained in PABX memory during call state changes reported by list messages.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. In a private branch exchange telephone system including a plurality of switching nodes, each of said switching nodes having a respective unique node identification number and each pair of said switching nodes being connected by a plurality of trunk lines, a method for recognizing and releasing unnecessary trunk lines, said method comprising the steps of:

(a) compiling a telephone call identifier list containing said node identification numbers and an associated trunk call identification number used in defining and connecting a call path between a calling party and a called party;

(b) examining said call identifier list at each of said switching nodes in said call path for information indicative of redundant ones of said node identification numbers; and (c) releasing said unnecessary trunk lines between said switching nodes in said call path corresponding to said redundant node identification numbers.

2. The method for recognizing and releasing unnecessary trunk lines as recited in claim 1, wherein said step (a) further comprises the steps of:

(d) transmitting a first node identification number and a first trunk call identification number corresponding to a first portion of said call path between adjacent ones of a first node and a second node of said switching nodes in said call path in a predetermined direction; and (e) repetitively appending a next node identification number and a corresponding next trunk call identification number for each subsequent portion of said call path to said call identifier list so as to compile said call identifier list.

3. The method for recognizing and releasing unnecessary trunk lines as recited in claim 2, wherein said predetermined direction is from a called party switching node to a calling party switching node.

4. The method for recognizing and releasing unnecessary trunk lines as recited in claim 1, wherein said information indicative of said redundant node identification numbers is presence of one of said node identification numbers in said call identifier list matching said unique node identification number for a current switching node.

5. The method for recognizing and releasing unnecessary trunk lines as recited in claim 1, wherein said step (c) further comprises the steps of:

(f) establishing a new call path between said calling party and said called party, said new call path bypassing said unnecessary trunk lines between said redundant node identification numbers; and (g) when said new call path is complete, performing the releasing of said unnecessary trunk lines between said switching nodes corresponding to said redundant node identification numbers.

6. The method for recognizing and releasing unnecessary trunk lines as recited in claim 1, said method further comprising the steps of:

(h) generating a list request message each time a predetermined operating state is achieved in one of said switching nodes in said call path; and (i) transmitting said request message in a predetermined direction corresponding to said call path.

7. The method for recognizing and releasing unnecessary trunk lines as recited in claim 6, wherein said predetermined operating state corresponds to an answer operation.

8. The method for recognizing and releasing unnecessary trunk lines as recited in claim 6, wherein said predetermined operating state corresponds to a transfer operation.

9. In a private branch exchange telephone system including a plurality of switching nodes, each of said switching nodes having a respective unique node identification number and each pair of said switching nodes being connected by a plurality of trunk lines carrying voice data and at least one alternative signalling path, a method for recognizing and releasing unnecessary trunk lines, said method comprising the steps of:

(a) transmitting a first node identification number and a first trunk call identification number corresponding to a first portion of a call path between adjacent ones of a first node and a second node of said switching nodes in a predetermined direction along said signalling path;

(b) repetitively appending in said switching nodes in said call path a next node identification number and a next trunk call identification number for each subsequent portion of said call path to thereby generate a telephone call identifier list containing each of said node identification numbers and an associated said trunk call identification number used in said call path between a calling party and a called party;

(c) examining said call identifier list for information indicative of redundant ones of said node identification numbers; and (d) releasing said unnecessary trunk lines between said switching nodes corresponding to said redundant node identification numbers.

10. The method for recognizing and releasing unnecessary trunk lines as recited in claim 9, wherein said information indicative of said redundant node identification numbers is the presence of one of said node identification numbers corresponding to said unique node identification number for a respective one of said switching nodes receiving said call identifier list.

11. The method for recognizing and releasing unnecessary trunk lines as recited in claim 9, wherein said step (d) further comprises the steps of:

(e) establishing a new call path between said calling party and said called party, said new call path bypassing said unnecessary trunk lines between said redundant node identification numbers; and (f) when said new call path is complete, performing the releasing of said unnecessary trunk lines between said switching nodes corresponding to said redundant node identification numbers.

12. The method for recognizing and releasing unnecessary trunk lines as recited in claim 9, said method further comprising the steps of:

(g) generating a list request message each time a predetermined operating state is achieved in one of said switching nodes; and (h) transmitting said request message along said signalling path in a predetermined direction along said call path.

13. The method for recognizing and releasing unnecessary trunk lines as recited in claim 12, wherein said predetermined operating state corresponds to an answer operation.

14. The method for recognizing and releasing unnecessary trunk lines as recited in claim 12, wherein said predetermined operating state corresponds to a transfer operation.

15. The method for recognizing and releasing unnecessary trunk lines as recited in claim 12, wherein said signalling path is an ISDN D Channel.

16. A method for recognizing and releasing unnecessary trunk lines in a private branch exchange telephone system including a plurality of switching nodes, wherein each of said switching nodes being assigned a respective unique node identification number and wherein any two of said switching nodes are connected by a plurality of trunk lines carrying voice data between a called party and a calling party and at least one alternative signalling path, said method comprising the steps of:

(a) generating a list request message each time a predetermined operating state is achieved in one of said switching nodes in a call path;

(b) transmitting said request message along said signalling path in a first predetermined direction along said call path;

(c) when said message request arrives at one end of said call path, transmitting a first node identification number and a first trunk call identification number corresponding to a first portion of said call path between adjacent ones of a first node and a second node in a second predetermined direction along said signalling path to thereby generate a call identifier list;

(d) comparing each of said node identification numbers in said call identifier list with a current node identification number corresponding to a respective one of said switching nodes in said call path receiving said call identifier list;

(e) when one of said node identification numbers in said call identifier list is said current node identification number, establishing a new call path between said calling party and said called party, said new call path bypassing said unnecessary trunk lines between redundant ones of said node identification numbers and, when said new call path is complete, releasing said unnecessary trunk lines between said redundant ones of said node identification numbers; and (f) when no match is established between any of said node identification numbers in said call identifier list and said current node identification number of a current node, repetitively appending a next node identification number and a next trunk call identification number for each subsequent portion of said call path.

17. The method for recognizing and releasing unnecessary trunk lines as recited in claim 16, wherein said predetermined operating state corresponds to an answer operation.

18. The method for recognizing and releasing unnecessary trunk lines as recited in claim 16, wherein said predetermined operating state corresponds to a transfer operation.

19. The method for recognizing and releasing unnecessary trunk lines as recited in claim 16, wherein said signalling path is an ISDN D Channel.

* * * * *

UNITED STATES PATENT AND TRADEMARK OFFICE
CERTIFICATE OF CORRECTION

PATENT NO. : 5,444,773
DATED : August 22, 1995
INVENTOR(S) : Paul Hirsohn, et al.

It is certified that error appears in the above-indentified patent and that said Letters Patent is hereby corrected as shown below:

```
On the title page, item [54] and column 1, line 2, change "TRUCKS"
to --TRUNKS--.
```

Signed and Sealed this

Twenty-first Day of November, 1995

Attest:

BRUCE LEHMAN

Attesting Officer

Commissioner of Patents and Trademarks